July 3, 1962 R. W. SMITH ETAL 3,042,309

VEHICLE-ALIGNING APPARATUS

Filed June 6, 1958 2 Sheets-Sheet 1

*INVENTORS*
ROBERT W. SMITH
ROBERT A. VAUGHAN
*BY*
CORBETT, MAHONEY, MILLER, & RAMBO ATTY'S.

July 3, 1962 R. W. SMITH ETAL 3,042,309

VEHICLE-ALIGNING APPARATUS

Filed June 6, 1958 2 Sheets-Sheet 2

INVENTOR'S
ROBERT W. SMITH
ROBERT A. VAUGHAN
BY
CORBETT, MAHONEY, MILLER, & RAMBO ATTY'S.

United States Patent Office 3,042,309

Patented July 3, 1962

3,042,309

VEHICLE-ALIGNING APPARATUS

Robert W. Smith and Robert A. Vaughan, Columbus, Ohio, assignors, by mesne assignments, to Dresser Industries, Inc., Dallas, Tex., a corporation of Delaware Filed June 6, 1958, Ser. No. 740,252
3 Claims. (Cl. 238—4)

This invention relates to vehicle-aligning apparatus. It has to do, more particularly, with apparatus for co-operating with the wheels of a vehicle for aligning the vehicle laterally relative to a fixed axis, for example, that of the guide rail of a vehicle-handling dolly of a mechanical parking garage, that of a hydraulic lift or service pit in a vehicle service station, or that of any other structure where predetermined relative lateral alignment of a vehicle is necessary or desirable.

In the following description, this vehicle-aligning apparatus will be described with reference to the alignment of a vehicle and specifically an automobile with a guide rail for a vehicle-handling dolly of the type used in transferring vehicles to and from the elevator of a mechanical parking garage, but it is to be understood that this is for purpose of illustration only and not in the way of limitation.

Vehicle parking garages of the so-called mechanical type employ a vehicle-handling or transferring dolly in transferring a vehicle to and from an elevator used to move the vehicle between selected levels. Such a dolly is disclosed in the copending application of Robert W. Smith, Serial No. 626,045, filed December 3, 1956, now U.S. Patent No. 2,846,186, issued August 5, 1958. This dolly operates on a single guide rail on the elevator platform which is brought into alignment with similar guide rails on the floor surfaces at the various levels. At the level where the vehicles are received for parking, usually the ground floor, a rail is positioned adjacent the elevator shaft and it is desirable to align the vehicle to be parked laterally with this rail so that the dolly can move onto the rail in proper position to lift the vehicle and move it onto the elevator. Therefore, it is important that each vehicle to be parked be quickly and accurately aligned with this dolly guide rail. Furthermore, it is important that the aligning means be such as not only to quickly align the vehicle with the rail but also to accomplish this without damage and undue wear on the tires of the vehicle. It has been attempted in the past to align the vehicle by means of fixed curbs or guides projecting above the floor which usually converge at their forward ends to engage the tires of the vehicle as it moves over the guide rail so as to shift the vehicle laterally as necessary. Obviously, this causes considerable wear on the tires due to the sides of the tires engaging the fixed curbs and rubbing thereagainst as well as to the bodily sliding laterally of the tires on the floor surface in the aligning operation. Furthermore, if the angle of approach of a vehicle relative to the aligning curbs is too great, it is necessary to back the vehicle and try the aligning operation over. Also, the curbs or fixed guides serve as obstructions on the floor to hamper movement of vehicles thereabout. Thus, prior art arrangements for aligning vehicles relative to the dolly guide rail have not been at all satisfactory.

It is the main object of this invention to provide a vehicle-aligning apparatus which will automatically align the vehicle as it moves into association with the apparatus and which will accomplish this aligning quickly and accurately.

Another object of this invention is to provide vehicle-aligning apparatus which will accomplish the aligning with substantially no wear on the tires of the vehicle.

Another object of this invention is to provide a vehicle-aligning apparatus which is of such a nature that the approach angle of the car relative to the apparatus may be substantial without interfering with the proper aligning function of the apparatus.

Still another object of this invention is to provide vehicle-aligning apparatus of the type indicated which is so arranged as to compensate for the slight differences in the spacing of the front and rear wheels of a vehicle.

Still another object of this invention is to provide aligning apparatus of the type indicated which will not substantially interfere with movement of vehicles in any direction over the surface in which it is located.

Various other advantages will be apparent.

One example of this invention is illustrated in the accompanying drawings but it is to be understood that details of the structure may be varied without departing from the basic principles of this invention.

Figure 1:
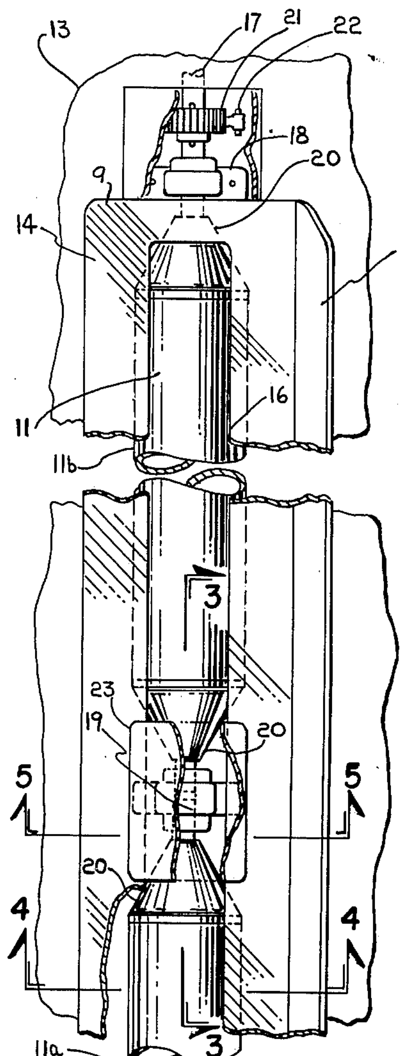
FIGURE 1 is a plan view, partly broken away, of the vehicle-aligning apparatus of this invention.
Figure 1:
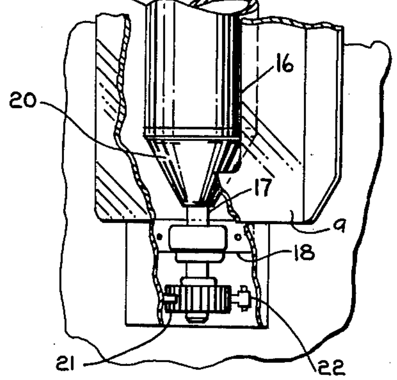

This invention is illustrated in the drawings as comprising a cradle 9 for receiving the front and rear wheels disposed in tandem along one side of a vehicle, the cradle being disposed in parallel relationship with the guide rail 12 or other structure with which the vehicle is to be aligned. Although in most installations a single cradle 9 is sufficient, a pair of laterally spaced cradles may be provided, if necessary, for receiving the front and rear wheels at both sides of the vehicle. The sides of the cradle preferably comprise a fixed guide flange 10 and a roller unit 11 extending longitudinally thereof in spaced relationship to the guide flange. This cradle arrangement is illustrated best in FIGURE 1 where the roller unit is shown as consisting of the axially-aligned rollers **11*a* and 11*b*, the roller 11*b* being the roller which will finally engage and position the front wheel and the roller 11*a*** being the one which will finally engage and position the rear wheel.

Figure 2:
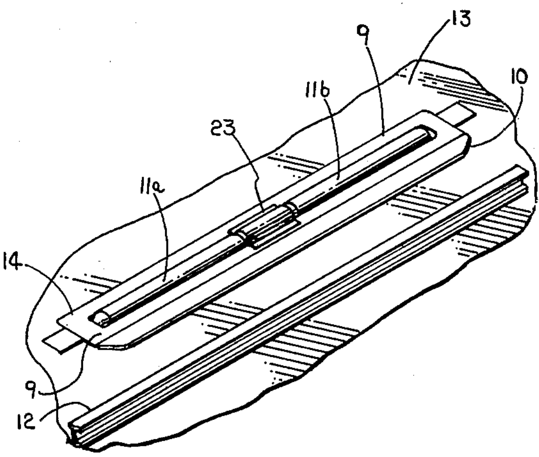
FIGURE 2 is an isometric view showing the apparatus disposed in parallel relationship to a dolly guide rail.
Figure 3:
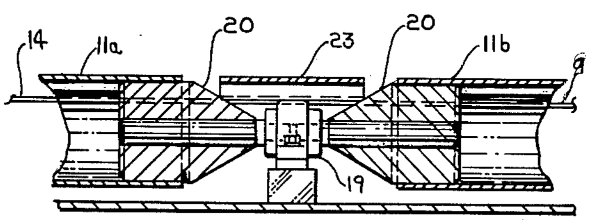
FIGURE 3 is a vertical axial sectional view taken along line 3—3 of FIGURE 1.

In FIGURE 2, the cradle 9 is shown associated with the guide rail 12 for the dolly of a parking garage. The cradle unit is disposed in parallel relationship with the rail 12. The rollers **11*a* and 11*b* are recessed within the floor surface 13 and a plate 14** is mounted on the floor surface and suitably secured thereto.

Figure 4:
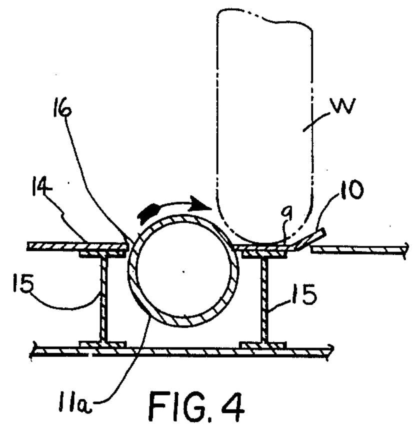
FIGURE 4 is a transverse sectional view taken along line 4—4 of FIGURE 1.
Figure 5:
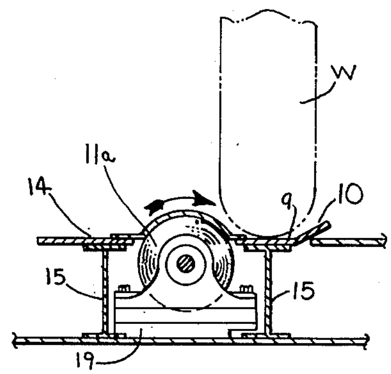
FIGURE 5 is a transverse sectional view taken along line 5—5 of FIGURE 1.

Preferably, the plate 14 is carried by the I-beams 15 shown best in FIGURES 4 and 5. These I-beams are disposed in spaced, parallel relationship and form a pit between them within which the greater portion of the rollers **11*a* and 11*b* are disposed. However, the circumference of each roller projects upwardly through a slot 16 in the plate. Each roller is carried by separate end shafts 17 which are rotatably supported in end bearing 18 and a central bearing 19. The opposed ends of the rollers are preferably tapered as indicated at 20. A substantial portion of each roller projects radially above the surface of the plate 14**. The amount which the roller projects can be varied but it is preferably less than half the diameter and more than one-fourth the diameter.

As previously indicated, the one side of the wheel-receiving cradle 9 is formed by the fixed flange 10. This flange is formed at the inner edge of the plate 14 extending throughout the entire length thereof. The flange extends outwardly and upwardly from the edge of the plate at a suitable angle. The spacing between the adjacent edge of the slot 16 and the flange 10 is such that the tires of the vehicle can be received therebetween. The rollers 11*a* and 11*b* will function to move the wheels towards the flange 10 when the wheels engage the rollers, each roller being rotated towards the flange 10, that is, in a clockwise direction, as indicated by the arrows in FIGURES 4 and 5. In some installations it may be desirable to provide at the outer end of each roller shaft 17 a ratchet wheel 21 keyed thereon and an adjacent ratchet pawl 22 which is provided for engaging the ratchet wheel so as to permit rotation of the roller in one direction, that is, towards the flange 10, but to prevent rotation in the opposite direction.

The plate 14 closely fits the outer tapered ends 20 of the rollers and their adjacent inner tapered ends 20 as well as the bearing structure 19 are covered by means of a suitable arcuate cover plate 23 whose edges terminate substantially flush with the plate 14. The tapered ends 20 of the two rollers are provided for engagement with the tires of a vehicle, the tapering preventing damage to the tires whether they enter at one end or the other of the cradle.

Figure 6:
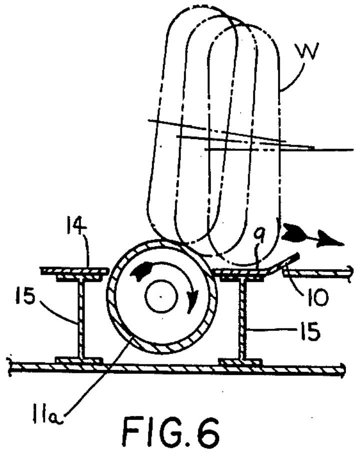
FIGURE 6 is a schematic view transversely through the aligning apparatus and illustrating its action in the lateral shifting of a vehicle wheel.
Figure 7:
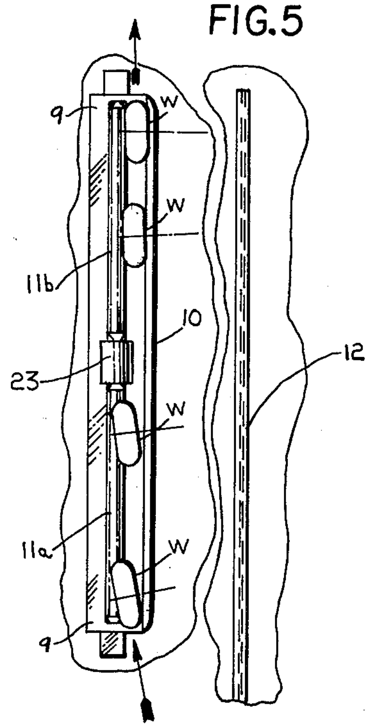
FIGURE 7 is a schematic plan view illustrating the gradual shifting of a wheel as it moves onto and along the aligning apparatus.

FIGURES 6 and 7 are exaggerated illustrations of the action of the rollers 11*a* and 11*b*. As the wheel indicated at W enters the cradle 9, it may enter at a substantial angle and will engage the roller 11*a*. As soon as the roller 11*a* is engaged by the wheel W, it will rotate towards the flange 10 and tend to shift the wheel towards the flange. As the wheel W continues its movement into the cradle, the wheel will be gradually moved towards the flange 10 and the angular position thereof will be gradually decreased as indicated in FIGURES 6 and 7. Eventually, the wheel W will be positioned between the second roller 11*b* and the flange 10 in a plane parallel thereto. The second or rear wheel will engage the roller 11*a* and will be bodily moved in the same manner. Because of the difference in spacing of the front and rear wheels, the use of two separate rollers 11*a* and 11*b* is desirable. Gradually shifting the wheels in this manner will result in the gradual shifting of the vehicle bodily to properly align and center it relative to the rail 12.

It will be apparent from the above description that this invention provides for a vehicle-aligning apparatus which consists of a cradle for receiving the front and rear wheels on at least one side of a vehicle. The wheel-receiving and aligning cradle comprises parallel sides formed preferably of a movable roller unit and a fixed flange. However, if desired, the flange can be replaced with another roller unit so that rollers form both sides of the cradle.

The guide apparatus of this invention will accomplish the aligning of the vehicle quickly and accurately with substantially no wear on the tires thereof. This is true even though the approach angle of the vehicle is substantial.

The apparatus will compensate for the slight differences in the spacing of the front and rear wheels by the use of separate, axially-aligned rollers. Although the apparatus will have the necessary aligning function, it will not project from the floor surface excessively so that it will be possible to drive over the apparatus crosswise if desirable in moving cars on the ground floor of a garage in which it may be positioned.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. Apparatus for bringing the front and rear wheels along one side of a motor vehicle into relative alignment during parking of the vehicle, comprising: an elongated cradle having a relatively narrow, longitudinally extending, flat, wheel-supporting surface upon which the front and rear wheels along one side of a vehicle may be driven; an elongated wheel-guiding member extending longitudinally of said cradle adjacent one side of the flat surface of said cradle and projecting generally upwardly above the level of said flat surface for guiding engagement with one of the vertical side surfaces of a vehicle wheel driven onto the flat surface of said cradle; elongated, generally cylindrical roller means positioned adjacent the opposite side of the flat surface of said cradle in transversely spaced relation to said wheel-guiding member, said roller means having an axis of rotation disposed in parallel relation to said wheel-guiding member and a peripheral portion extending substantially above the level of the flat surface of said cradle for engagement with the opposite vertical side surface of a vehicle wheel driven upon said flat surface; means supporting said roller means for axial rotation; and means connected with said roller means for preventing rotation of the peripheral portion thereof which extends above the level of said flat surface in a direction away from said wheel-guiding member.

2. Apparatus as defined in claim 1, wherein said roller means comprises a plurality of axially aligned, independently rotatable roller sections arranged in tandem for engaging different wheels of a vehicle driven onto said flat surface, and wherein each of said roller sections is provided with means to prevent rotation thereof in a direction away from said wheel-guiding means.

3. Apparatus as defined in claim 1, wherein said roller means includes opposite end portions tapering inwardly toward the axis of rotation of said roller means.

References Cited in the file of this patent

UNITED STATES PATENTS

| | | |
|---|---|---|
| 731,387 | Renfroe | June 16, 1903 |
| 1,606,371 | Kitchen | Nov. 9, 1926 |
| 2,085,329 | Porte | June 29, 1937 |
| 2,290,652 | Russell | July 21, 1942 |
| 2,607,536 | White | Aug. 19, 1952 |
| 2,846,088 | Porter | Aug. 5, 1958 |